United States Patent [19]

Magoteaux

[11] Patent Number: 5,615,915

[45] Date of Patent: Apr. 1, 1997

[54] AIR BAG FOLDING METHOD

[75] Inventor: David G. Magoteaux, Gilbert, Ariz.

[73] Assignee: TRW Inc., Lyndhurst, Ohio

[21] Appl. No.: 643,576

[22] Filed: May 6, 1996

[51] Int. Cl.⁶ .................................................. B60R 21/16
[52] U.S. Cl. ............................................................ 280/743.1
[58] Field of Search .............................. 280/743.1, 728.1; 428/35.2, 35.5

[56] References Cited

U.S. PATENT DOCUMENTS

| | | | |
|---|---|---|---|
| 4,004,828 | 1/1977 | Sogabe et al. | 280/743.1 |
| 4,173,356 | 11/1979 | Ross | 280/743.1 |
| 4,235,453 | 11/1980 | Lawson et al. | 280/743.1 |
| 5,140,799 | 8/1992 | Satoh | 280/743.1 |
| 5,378,019 | 1/1995 | Smith et al. | 280/743.1 |
| 5,533,755 | 7/1996 | Nelson et al. | 280/743.1 |

FOREIGN PATENT DOCUMENTS

| | | | |
|---|---|---|---|
| 0167048 | 7/1991 | Japan | 280/743.1 |
| 4278860 | 10/1992 | Japan | 280/743.1 |

*Primary Examiner*—Christopher P. Ellis
*Attorney, Agent, or Firm*—Tarolli, Sundheim, Covell, Tummino & Szabo

[57] ABSTRACT

In a method of folding an inflatable vehicle occupant protection device (14), such as an air bag, the protection device (14) is initially placed in a square configuration. The square configuration is bounded by four side edges (60,62,64,66) of a square panel layer (56) which overlies an inlet opening (46) in the protection device (14). Next, four corner portions (90) of the protection device (14) are pivoted inward about four corresponding fold lines (80,82,84,86). This places the protection device (14) in a smaller square configuration which is bounded by the four fold lines (80–86). The pivoting step is repeated to place the protection device (14) in a successively smaller square configuration each time that step is repeated.

12 Claims, 4 Drawing Sheets

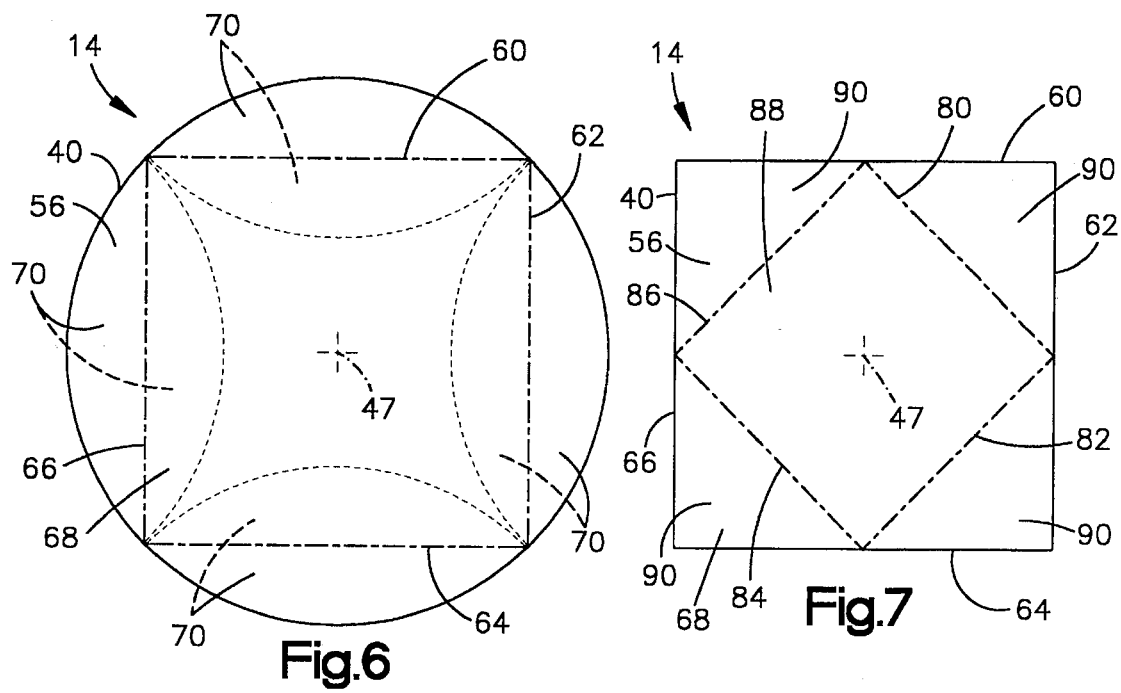
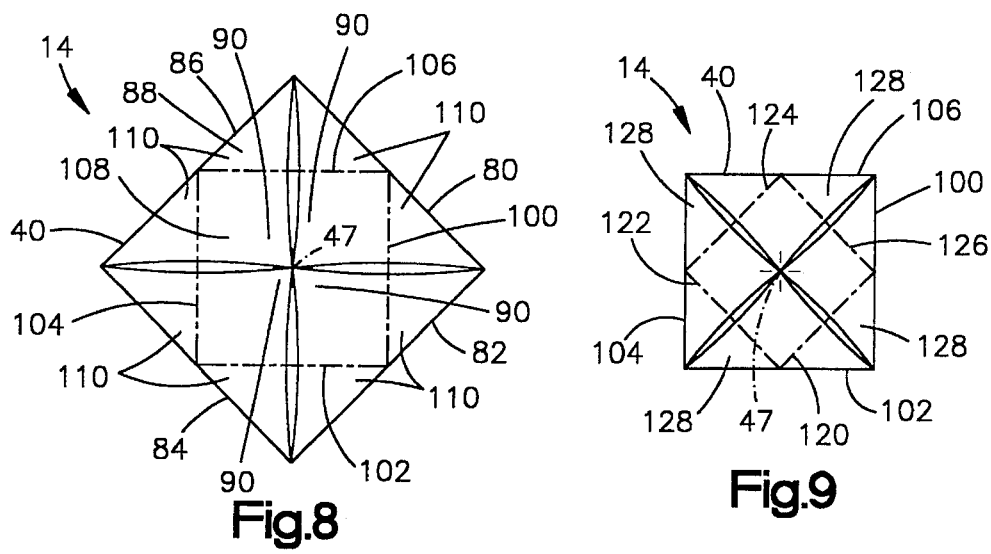
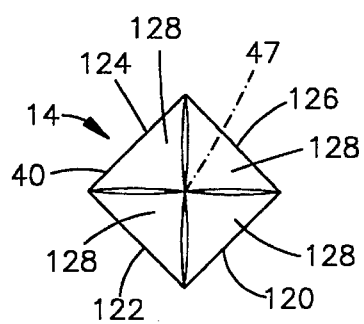

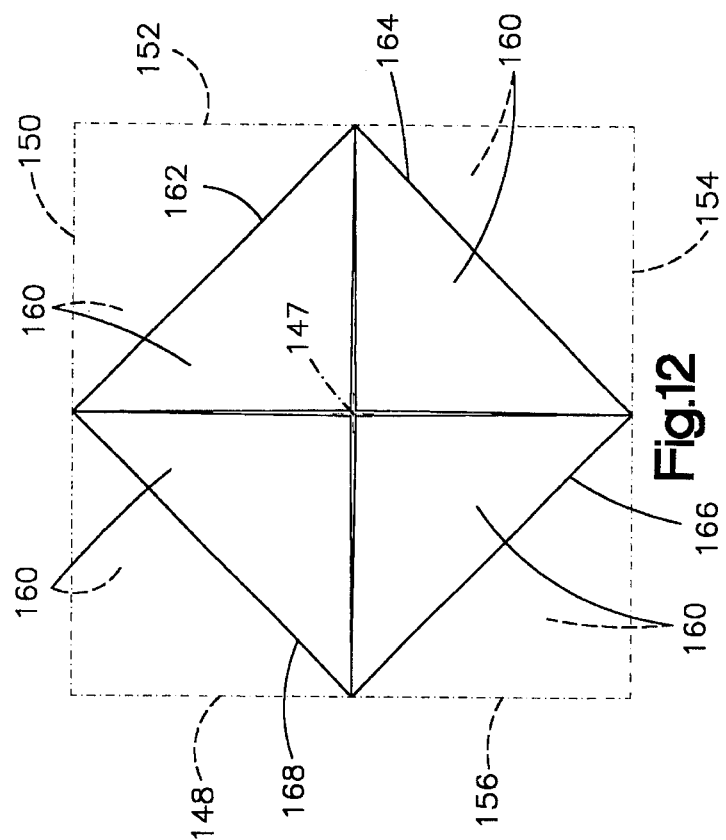
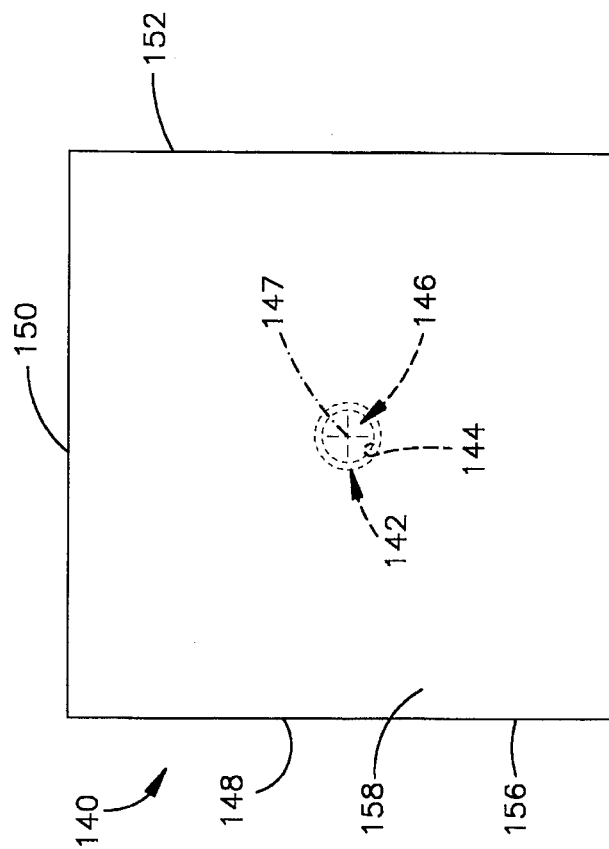
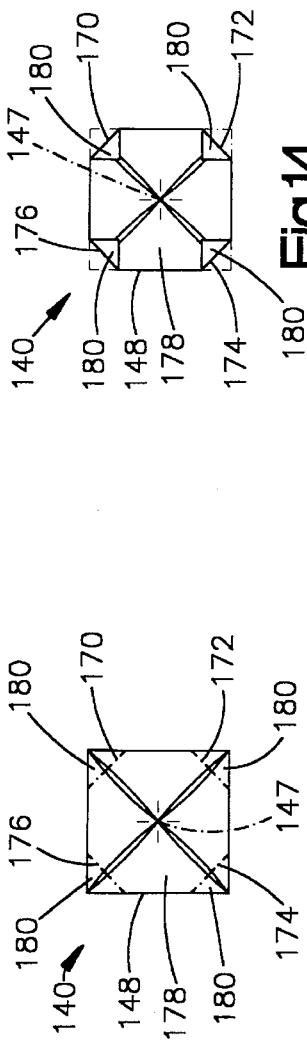

AIR BAG FOLDING METHOD

FIELD OF THE INVENTION

The present invention relates to an inflatable vehicle occupant protection device, such as an air bag, and particularly relates to folding of the protection device.

BACKGROUND OF THE INVENTION

A particular type of inflatable vehicle occupant protection device is commonly referred to as an air bag. An air bag is stored in a vehicle in a folded, uninflated condition at a location adjacent to the vehicle occupant compartment. When the air bag is to be inflated, inflation fluid is directed to flow from a source of inflation fluid into the air bag. The inflation fluid inflates the air bag from the folded, uninflated condition to an unfolded, inflated condition in which the air bag extends into the vehicle occupant compartment.

When the air bag is being inflated into the vehicle occupant compartment, it engages an occupant of the vehicle to help protect the occupant from a forceful impact with parts of the vehicle. The manner in which the air bag engages the occupant is determined in part by the configuration and location of the air bag relative to the occupant as the air bag unfolds and moves into the vehicle occupant compartment.

SUMMARY OF THE INVENTION

The present invention is a method of folding an inflatable vehicle occupant protection device having a panel structure and an inlet opening. The protection device is inflatable from a folded, uninflated condition to an unfolded, inflated condition upon receiving inflation fluid through the inlet opening.

In accordance with the present invention, the protection device is initially placed in a square configuration. The square configuration is bounded by four side edges of a square panel layer which overlies the inlet opening. Next, four corner portions of the protection device are pivoted inward about four corresponding fold lines. This places the protection device in a smaller square configuration which is bounded by the four fold lines. The pivoting step is repeated to place the protection device in a successively smaller square configuration each time that step is repeated.

When a vehicle occupant protection device has been folded in accordance with the present invention, inflation fluid directed inward through the inlet opening will move the square outer panel layer into a vehicle occupant compartment in a predetermined manner. Specifically, the inflation fluid will unfold and move the protection device away from the inlet opening in a direction extending along a central axis of the inlet opening. The inflation fluid will simultaneously unfold and move the protection device radially outward from the axis of the inlet opening. In accordance with the present invention, the successively folded corner portions of the protection device will be unfolded symmetrically and evenly around the axis of the inlet opening until the square outer panel layer emerges from the unfolding corner portions. The square outer panel layer is thus spread out evenly from the axis of the inlet opening while it is being moved outward along the axis. This helps to minimize the degree to which the square outer panel layer moves transversely across the inlet opening when it moves outward from the inlet opening.

BRIEF DESCRIPTION OF THE DRAWINGS

Further features of the present invention will become apparent to those skilled in the art to which the present invention relates from reading the following description with reference to the accompanying drawings, in which:

FIG. 6 is a view similar to FIG. 5 showing the protection device in an unfolded condition;

FIG. 7 is a view similar to FIG. 6 showing the protection device in an initially folded condition;

FIGS. 8–10 are views similar to FIG. 7 showing the protection device in successively folded conditions;

FIG. 11 is a view similar to FIG. 6 showing an alternative vehicle occupant protection device comprising a second embodiment of the present invention; and FIGS. 12–14 are views showing the alternative protection device in successively folded conditions.

DETAILED DESCRIPTION OF PREFERRED EMBODIMENTS

Figure 2:
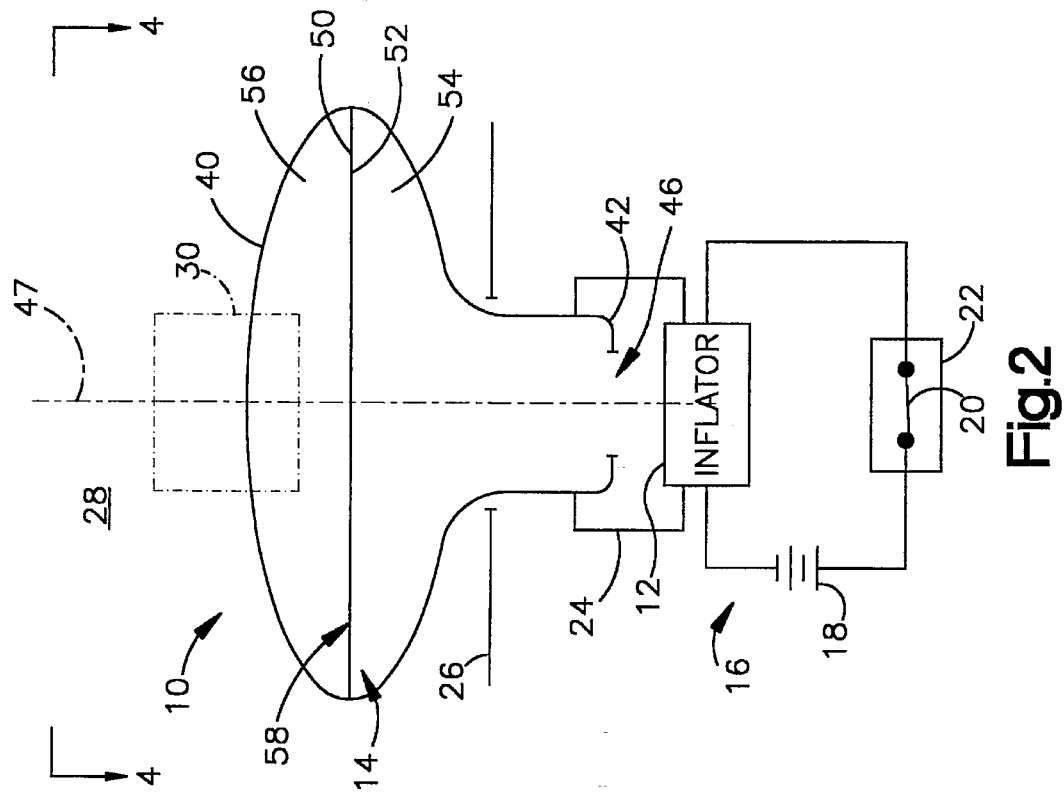
FIG. 2 is a view similar to FIG. 1 showing the apparatus in an actuated condition.
Figure 1:
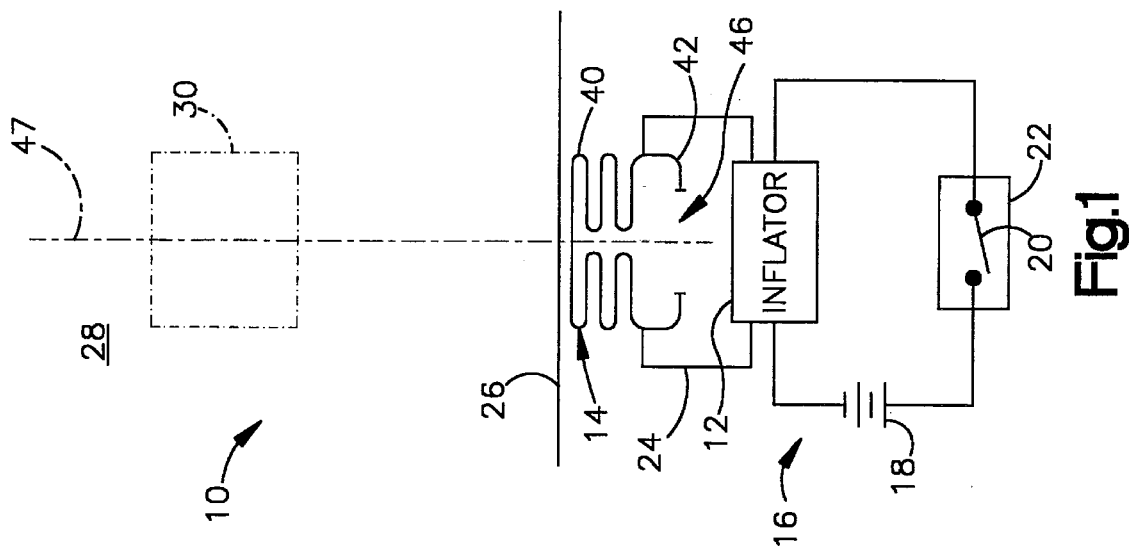
FIG. 1 is a schematic view of an apparatus including an inflatable vehicle occupant protection device comprising a first embodiment of the present invention.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from a folded, uninflated condition, as shown in FIG. 1, to an unfolded, fully inflated condition, as shown in FIG. 2. Other inflatable vehicle occupant protection devices include inflatable seat belts, inflatable knee bolsters, inflatable head liners, and knee bolsters operated by inflatable air bags.

The inflator 12 comprises a source of inflation fluid for inflating the air bag 14. As known in the art, the inflator 12 may contain an ignitable gas generating material for generating a large volume of gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 which senses a condition indicating the occurrence of a vehicle collision. The condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 14 is desired to help protect an occupant of the vehicle. When the sensor 22 senses such a collision-indicating condition, the switch 20 closes and electric current is directed through the inflator 12 to actuate the inflator 12. As a result, the inflator 12 rapidly emits a large volume of inflation fluid which flows into the air bag 14 to inflate the air bag 14.

The air bag 14 and the inflator 12 are mounted on a supporting structure 24 which, in turn, is mounted on a part 26 of the vehicle adjacent to the vehicle occupant compartment 28. The supporting structure 24 could be a reaction plate, a reaction canister, a manifold, or the like. Accordingly, the part 26 of the vehicle on which the supporting structure 24 is mounted could be the steering wheel or steering column, the instrument panel, a door panel, or the like. Moreover, the air bag 14 is located in the vehicle with reference to a predetermined occupant position 30 in the occupant compartment 28. As viewed from above in FIGS. 1 and 2, the inflating air bag 14 moves toward the predetermined occupant position 30 to restrain movement of a vehicle occupant in the opposite direction toward the part 26 of the vehicle on which the air bag 14 is mounted.

The structure of the air bag 14 is defined by one or more panels that can be formed of any suitable air bag material. The panels of air bag material are interconnected along seams that are formed by stitches, ultrasonic welds, adhesives, heat-staking, or the like, depending on the particular air bag material of which the panels are formed. Preferably, the air bag 14 is constructed of panels formed of a nylon fabric which is coated with silicone. Such an air bag material is known in the art.

As shown in FIGS. 1 and 2, the air bag 14 has a body 40 and a neck 42. When the air bag 14 is being inflated, the body 40 is moved from the vehicle part 26 into the vehicle occupant compartment 28. The neck 42 is retained on the vehicle part 26 by the supporting structure 24.

Figure 3:
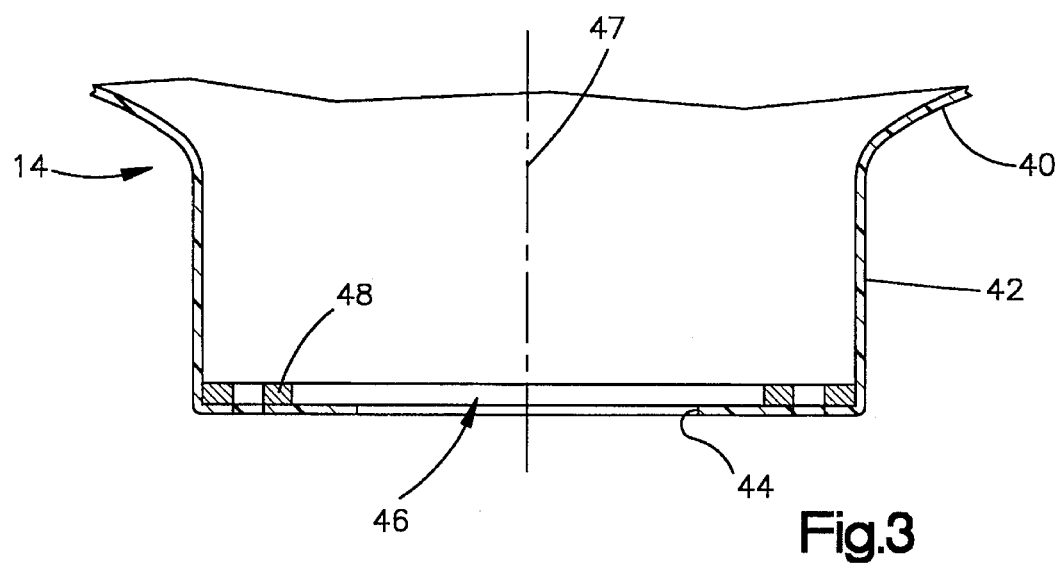
FIG. 3 is an enlarged, partial cross-sectional view of the protection device of FIGS. 1 and 2.

As shown by way of example in FIG. 3, the neck 42 has a generally cylindrical shape with a circular inner edge 44. The inner edge 44 defines a circular inlet opening 46 with a central axis 47. A retainer ring 48 is used with fasteners (not shown) to fasten and retain the neck 42 on the supporting structure 24 (FIG. 1) in a known manner, with the inlet opening 46 being located in a position to receive the inflation fluid emitted from the inflator 12. The neck 42 and the inlet opening 46 may alternatively have any other suitable shape, such as a square or rectangular shape.

The body 40 of the air bag 14 also may have any suitable shape, depending upon the particular location of the air bag 14 in the vehicle. In the first embodiment of the present invention, the body 40 has a curvilinear peripheral shape, as viewed in FIG. 4, when the air bag 14 is in the fully inflated condition of FIG. 2. More specifically, the body 40 in the first embodiment has a circular peripheral shape centered on the axis 47 when it is unfolded and inflated fully outward from the neck 42, as viewed in FIG. 4.

Figure 4:
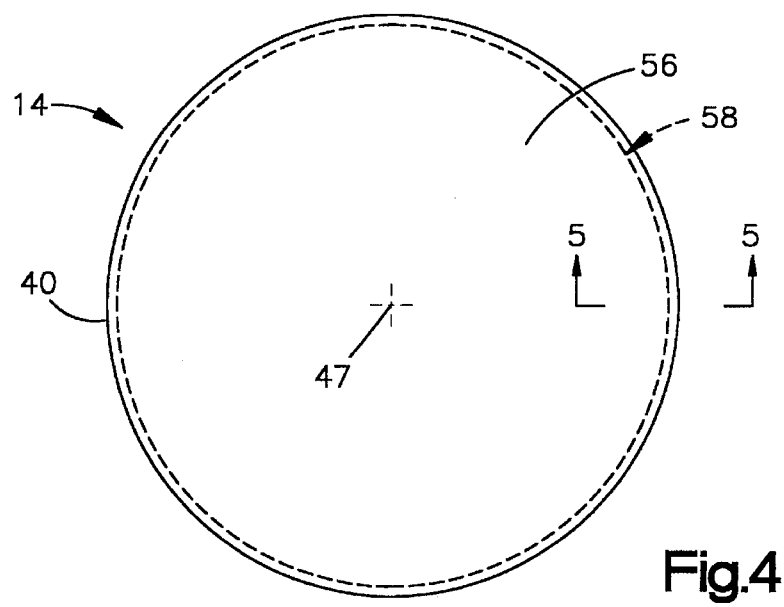
FIG. 4 is a view taken on line 4—4 of FIG. 2.
Figure 5:
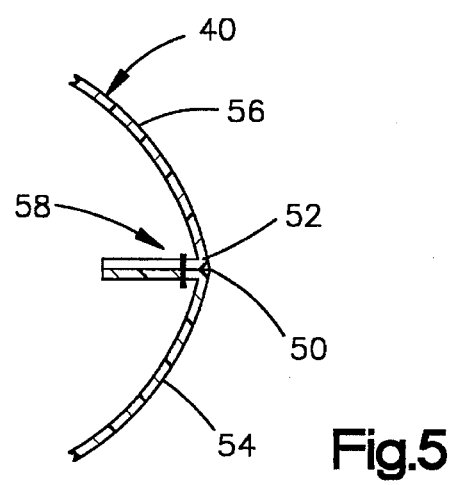
FIG. 5 is a view taken on line 5—5 of FIG. 4.

As shown in FIGS. 2, 4 and 5, the circular peripheral shape of the body 40 is defined by adjoining, circular peripheral edges 50 and 52 of two adjacent panel layers 54 and 56. When the air bag 14 has been inflated outward from the vehicle part 26, as shown in FIG. 2, the first panel layer 54 faces inward toward the vehicle part 26. The second panel layer 56 faces outward from the vehicle part 26 toward the predetermined occupant position 30. Accordingly, the first and second panel layers 54 and 56 are hereafter referred to as the inner and outer panel layers 54 and 56, respectively. A circumferentially extending seam 58 (shown schematically) joins the inner and outer panel layers 54 and 56 to each other adjacent to their circular peripheral edges 50 and 52.

In the method of folding the air bag 14 in accordance with the present invention, the air bag 14 is first placed in the unfolded condition in which it is shown in FIG. 6. In that condition, the body 40 of the air bag 14 is spread radially outward from the neck 42 such that the outer panel layer 56 fully overlies the inner panel layer 54 and the inlet opening 46. A first set of four fold lines 60, 62, 64, and 66 is then defined on the body 40 of the air bag 14. The four fold lines 60–66 together outline a square portion 68 of the body 40 which is centered on the axis 47 of the inlet opening 46. Additionally, each of the four fold lines 60–66 defines the base of a corresponding peripheral portion 70 of the body 40 which adjoins the square central portion 68. Since the body 40 has a circular peripheral shape, as viewed in FIG. 6, the peripheral portions 70 are arcuate segments which all have the same size and shape, and which are all centered on the axis 47. Moreover, since the arcuate segments 70 are located at corresponding sides of the square central portion 68, they are evenly distributed circumferentially around the axis 47.

In a first folding step, the arcuate segments 70 of the body 40 are inverted and tucked between the inner and outer panel layers 54 and 56. The arcuate segments 70 are thus moved radially inward to the positions in which they are shown in dashed lines in FIG. 6. In this manner, the air bag 14 is reduced and re-shaped peripherally, and is placed in a square configuration (FIG. 7) which is bounded on four sides by the four fold lines 60–66. The outer panel layer 56 is likewise reduced and re-shaped peripherally so as to have a square peripheral shape with four side edges defined by the four fold lines 60–66.

As shown in FIG. 7, a second set of four fold lines 80, 82, 84, and 86 is defined on the body 40 of the air bag 14. The fold lines 80, 82, 84, and 86 are offset 45° about the axis 47 from the fold lines 60, 62, 64, and 66, respectively. The fold lines 80–86 thus outline a second, smaller square portion 88 of the body 40 which is centered on the axis 47. The fold lines 80–86 also define the bases of four equally sized, triangular corner portions 90 of the body 40 which are symmetrical and evenly distributed about the axis 47. In a second folding step, the corner portions 90 are moved pivotally inward about the fold lines 80–86 from the positions of FIG. 7 to the positions of FIG. 8. The air bag 14 is thus placed in a second, smaller square configuration which is bounded on four sides by the four fold lines 80–86.

In the next step, a third set of four fold lines 100, 102, 104, and 106 is defined on the body 40 of the air bag 14. As shown in FIG. 8, the fold lines 100–106 together outline a third square portion 108 of the body 40 which is smaller than the second square portion 88 shown in FIG. 7. Each of the fold lines 100–106 defines the base of a corresponding corner portion 110. The corner portions 110 of FIG. 8 are smaller than, and are offset 45° from, the corner portions 90 of FIG. 7.

In a third folding step, the corner portions 110 are moved pivotally inward about the fold lines 100–106 from the positions of FIG. 8 to the positions of FIG. 9. The air bag 14 is thus placed in a third square configuration which is bounded on four sides by the four fold lines 100–106. Like each successive square configuration that is attained in accordance with the present invention, the square configuration of FIG. 9 is smaller than the next preceding square configuration, and is offset 45° from the next preceding square configuration.

A final, smallest square configuration of the air bag 14 is attained by defining a fourth set of fold lines 120–126 on the body 40 of FIG. 9, and by moving four corresponding corner portions 128 pivotally inward to the positions in which they are shown in FIG. 10. Importantly, when the air bag 14 is in the finally folded condition of FIG. 10, the corner portions 90, 110, and 128 are distributed evenly around the axis 47 as a result of their symmetry and 45° offset.

When the inflation fluid emitted from the inflator 12 flows into the air bag 14 through the inlet opening 46, it inflates the body 40 of the air bag 14 from the finally folded condition of FIG. 10 to the unfolded, fully inflated condition of FIGS. 2 and 5. The corner portions 90, 110, and 128 are moved away from the inlet opening 46 in directions extending radially outward from the axis 47. The corner portions 90, 110, and 128 are simultaneously moved away from the inlet opening 46 along the axis 47. This continues until the square outer panel layer 56 (FIG. 7) emerges from the unfolding body 40 of the air bag 14.

Since the folded corner portions 90, 110, and 128 are distributed evenly around the axis 47, they are unfolded and moved radially outward evenly around the axis 47. Therefore, when the square outer panel layer 56 of FIG. 7 emerges from the unfolding body 40, it spreads radially outward evenly around the axis 47. The arcuate segments 70 of FIG. 6 will likewise be unfolded and moved radially outward evenly around the axis 47. The unfolding body 40 of the air bag 14 will thus spread radially outward evenly around the axis 47 as it moves toward the predetermined occupant position 30 (FIG. 2) in a direction extending along the axis 47. This is especially beneficial when the air bag 14 is mounted on a vehicle steering wheel. The unfolding body 40 will then spread radially outward evenly around the axis 47 regardless of the rotational position of the steering wheel and the air bag 14 at the time of a vehicle collision.

An alternative air bag 140 comprising a second embodiment of the present invention is shown in FIG. 11. The view of the air bag 140 shown in FIG. 11 corresponds with the view of the air bag 14 shown in FIG. 6. Like the air bag 14, the air bag 140 has a generally cylindrical neck 142 with an inner edge 144 defining a circular inlet opening 146 centered on an axis 147. Unlike the air bag 14, the air bag 140 has a body 148 with a square, rather than a circular, peripheral shape. More specifically, when the body 148 is spread out in the unfolded condition of FIG. 11, it has a square peripheral shape bounded by four side edges 150, 152, 154, and 156 of a square outer panel layer 158 which overlies the inlet opening 146.

In the method of folding the air bag 140 in accordance with the present invention, the air bag 140 is provided with successively smaller square configurations in a succession of folding steps like the folding steps described above with reference to FIGS. 7–10. For example, in a first folding step, four triangular corner portions 160 (FIG. 12) of the body 148 are moved pivotally inward about a corresponding set of four fold lines 162, 164, 166, and 168. Such a folding step is repeated until the air bag 140 has a suitably small square configuration, such as the square configuration in which it is shown in FIG. 13.

Next, a final set of four fold lines 170, 172, 174, and 176 is defined on the body 148 of the air bag 150. However, unlike each set of fold lines described above, the final set of fold lines 170–176 does not outline a square central portion of the body 148. Instead, the final set of fold lines 170–176 defines four sides of an octagonal central portion 178 of the body 148. The fold lines 170–176 thus define the bases of four equally-sized, triangular corner portions 180 which are relatively smaller than any of the corner portion described above. In a final folding step, the corner portions 180 are moved pivotally inward about the fold lines 170–176 to place the air bag 150 in the octagonal configuration in which it is shown in FIG. 14.

When the air bag 150 is inflated from the finally folded configuration of FIG. 14, the corner portions 180 and 160, as well as additional corner portions (not shown) formed in intervening folding steps, are moved radially outward from the inlet opening 146 evenly around the axis 147. As a result, the square outer panel layer 158 of FIG. 11 emerges from the unfolding body 148 evenly around the axis 147. The square outer panel layer 158 thus moves directly toward the location of a corresponding vehicle occupant in the same manner as described above with reference to the square outer panel layer 56.

From the above description of the invention, those skilled in the art will perceive improvements, changes and modifications. For example, the number of successive corner folding steps, and the resulting number of successively smaller square configurations, can vary. The final folding step of FIGS. 13–14 for the alternative air bag 140 could be omitted, and/or could be performed on the air bag 14. Additionally, that folding step could be an intermediate rather than a final folding step. Such improvements, changes and modifications within the skill of the art are intended to be covered by the appended claims.

Having described the invention, the following is claimed:

1. A method of folding an inflatable vehicle occupant protection device having a panel structure and an inflation fluid inlet opening, said method comprising the steps of:

placing the protection device in a square configuration, said square configuration being bounded by four side edges of a square panel layer which overlies the inlet opening;

pivoting four corner portions of the protection device inward about four corresponding fold lines to place the protection device in a smaller square configuration bounded by said fold lines; and repeating said pivoting step to place the protection device in a successively smaller square configuration each time said pivoting step is repeated.

2. A method as defined in claim 1 wherein the protection device is placed in said square configuration by tucking peripheral portions of the protection device inward between adjacent panel layers.

3. A method as defined in claim 1 wherein the protection device is first placed in a curvilinear configuration, said curvilinear configuration being bounded by curvilinear peripheral edges of adjacent panel layers, said placing step including the step of tucking peripheral arcuate segments of the protection device radially inward between said adjacent panel layers to place the protection device in said square configuration.

4. A method as defined in claim 3 wherein said curvilinear configuration is circular, said peripheral arcuate segments being centered on a common axis and being tucked radially inward toward said common axis.

5. A method as defined in claim 1 wherein said placing step includes spreading the protection device out in an unfolded configuration having said square configuration.

6. A method as defined in claim 1 further comprising the step of pivoting four additional corner portions of the protection device inward about a corresponding set of four additional fold lines to place the protection device in an octagonal configuration bounded in part by said four additional fold lines.

7. A method of folding an inflatable vehicle occupant protection device having a panel structure and an inflation fluid inlet opening, said method comprising the steps of:

spreading the protection device out in an unfolded condition having a configuration bounded by peripheral edges of adjacent panel layers;

placing the protection device in a square configuration by tucking peripheral portions of the protection device inward between said adjacent panel layers;

pivoting four corner portions of the protection device inward about four corresponding fold lines to place the protection device in a smaller square configuration bounded by said fold lines; and repeating said pivoting step to place the protection device in a successively smaller square configuration each time said pivoting step is repeated.

8. A method as defined in claim 7 wherein said peripheral edges of said adjacent panel layers are curvilinear, said peripheral portions of the protection device being arcuate segments, said placing step including tucking said arcuate segments radially inward between said adjacent panel layers.

9. A method as defined in claim 8 wherein said arcuate segments are centered on a common axis and are tucked radially inward between said adjacent panel layers toward said common axis.

10. A method as defined in claim 7 further comprising the step of pivoting four additional corner portions of the protection device inward about a corresponding set of four additional fold lines to place the protection device in an octagonal configuration bounded in part by said four additional fold lines.

11. A method of folding an inflatable vehicle occupant protection device having a panel structure and an inflation fluid inlet opening, said method comprising the steps of:

spreading the protection device out in an unfolded condition having a square configuration, said square configuration being bounded by four side edges of a square panel layer which overlies the inlet opening;

pivoting four corner portions of the protection device inward about four corresponding fold lines to place the protection device in a smaller square configuration bounded by said fold lines; and repeating said pivoting step to place the protection device in a successively smaller square configuration each time said pivoting step is repeated.

12. A method as defined in claim 11 further comprising the step of pivoting four additional corner portions of the protection device inward about a corresponding set of four additional fold lines to place the protection device in an octagonal configuration bounded in part by said four additional fold lines.

* * * * *